United States Patent
Smith

[15] 3,665,538
[45] May 30, 1972

[54] DOCKBOARD

[72] Inventor: Matthew Smith, West Allis, Wis.

[73] Assignee: Kelley Company, Inc., Milwaukee, Wis.

[22] Filed: Aug. 1, 1969

[21] Appl. No.: 846,722

[52] U.S. Cl. ................................................................14/71
[51] Int. Cl. ......................................................B65g 11/00
[58] Field of Search......................................................14/71

[56] References Cited

UNITED STATES PATENTS

| | | | |
|---|---|---|---|
| 1,993,261 | 3/1935 | Colgate | 14/71 |
| 3,018,496 | 1/1962 | Hosbein | 14/71 |
| 3,440,673 | 4/1969 | Kelley | 14/71 |
| 3,486,181 | 12/1969 | Hecker et al. | 14/71 |

Primary Examiner—Jacob L. Nackenoff
Attorney—Andrus, Sceales, Starke & Sawall

[57] ABSTRACT

A dockboard to span the gap between a loading dock and the bed of a carrier. The ramp of the dockboard is stored vertically along the front wall of the dock and the side edges of the ramp are pivotally connected to guide members which are movable in vertical guideways mounted on the front surface of the dock. The ramp is raised upwardly from its vertical storage position to a location generally above the height of the dock, pivoted to a generally horizontal position and then lowered downwardly to span the gap between the loading dock and the carrier.

The weight of the ramp is counterbalanced by a series of springs connected through a pair of scissors-type arms to the ramp. The combined force of the springs is slightly less than the weight of the ramp, so that the ramp is biased downwardly, and the springs are arranged so that the maximum spring force is exerted against the ramp when the ramp is initially moved up from its vertical storage position and a lesser spring force is applied to the ramp when the ramp has been elevated to an above dock position.

16 Claims, 11 Drawing Figures

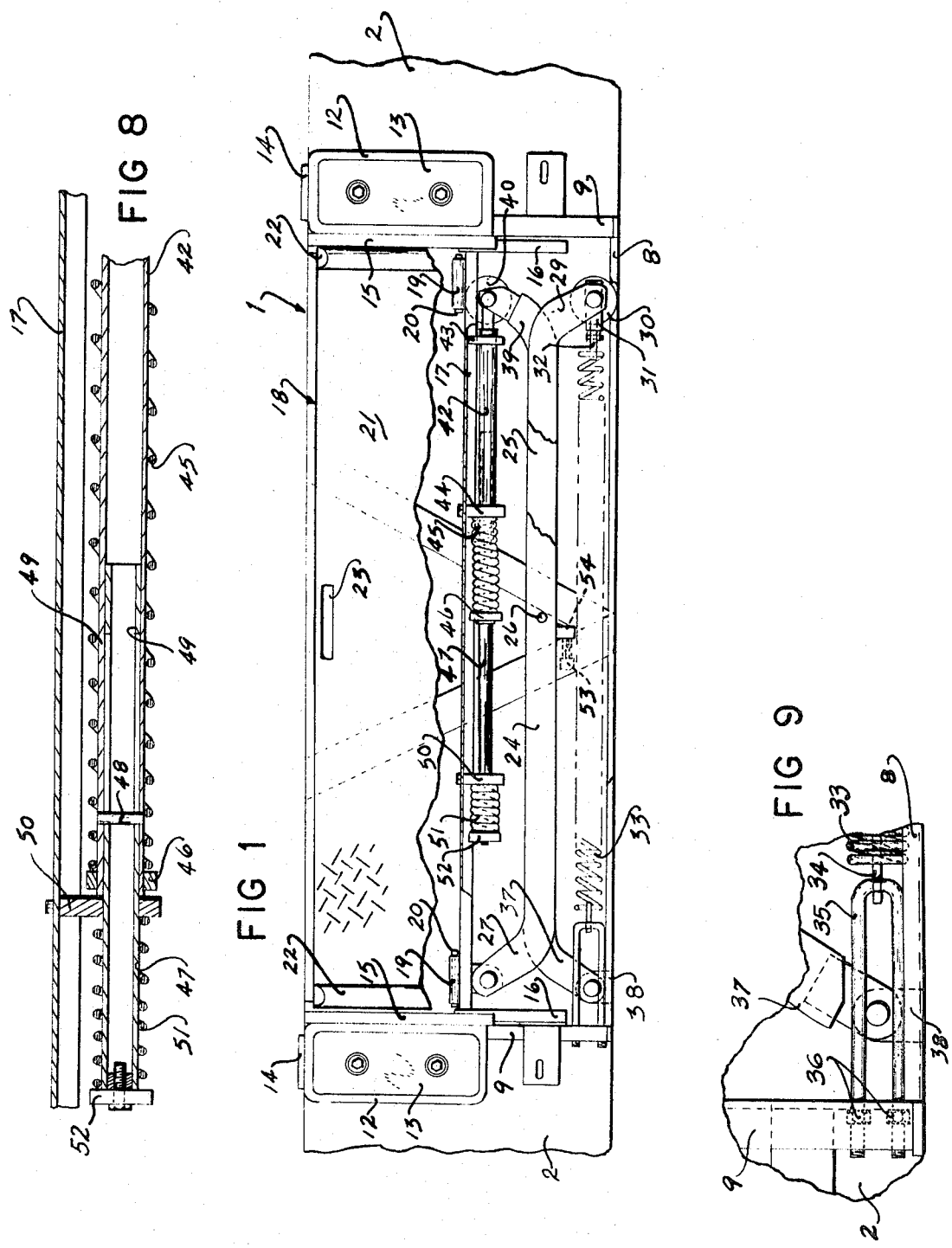

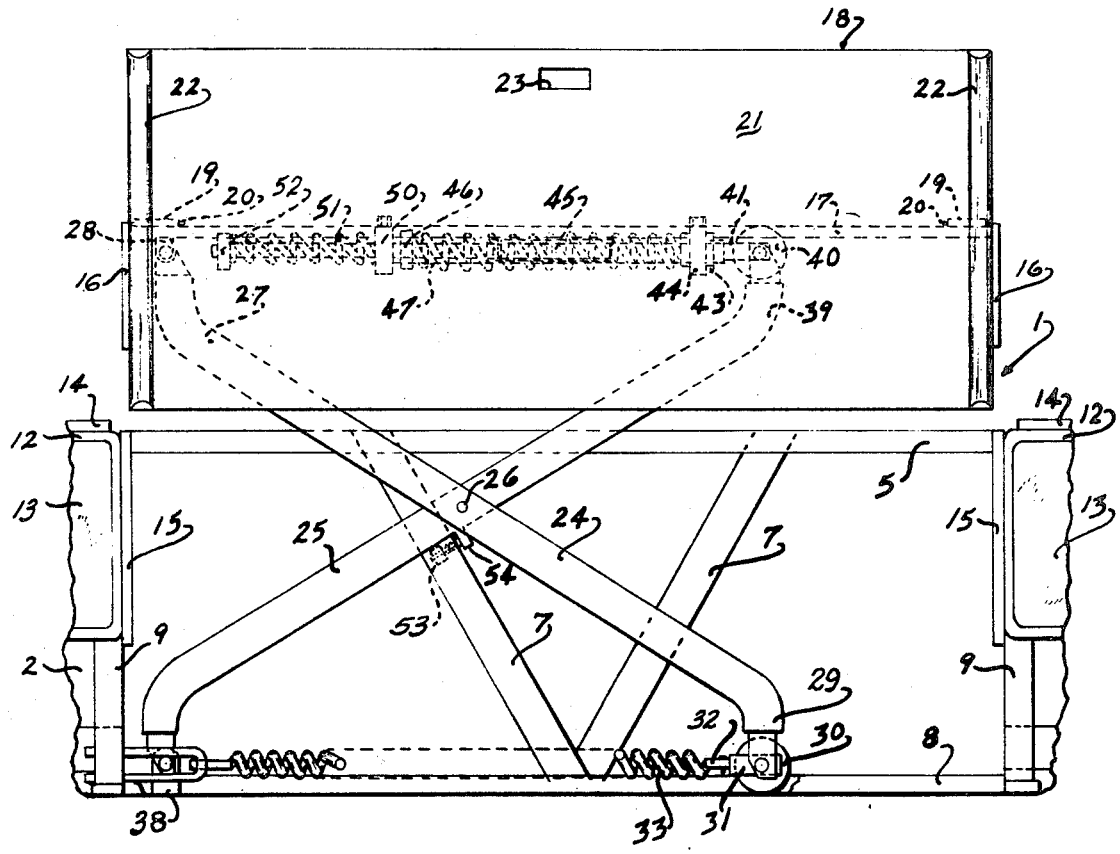
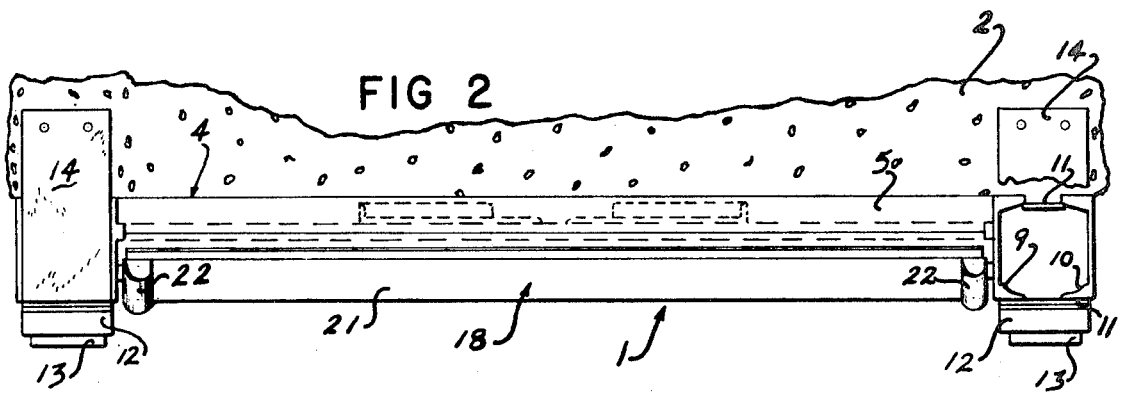

INVENTOR.
MATTHEW SMITH

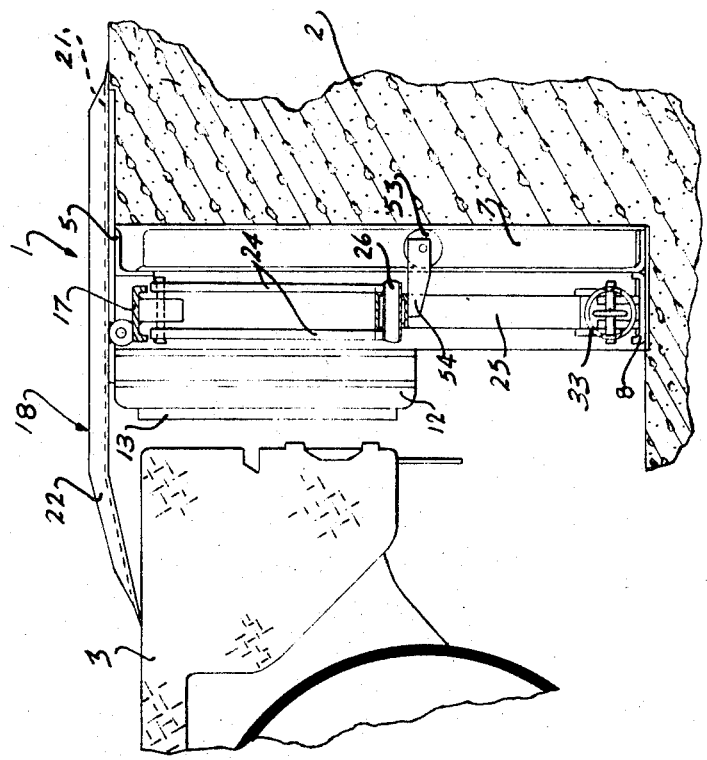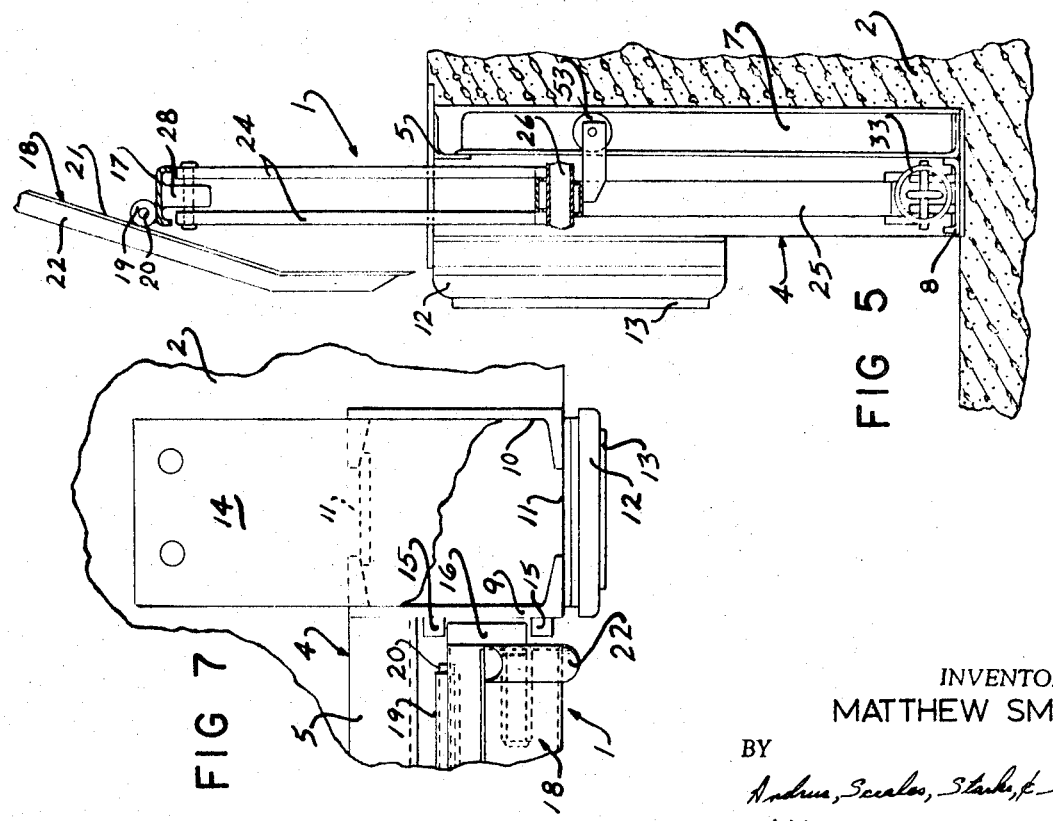

DOCKBOARD

The present invention relates to a dockboard to span the gap between a loading dock and the bed of a carrier, and more particularly to a dockboard of the type which is stored vertically in front of the dock.

One common form of the dockboard is mounted in a pit formed in the upper surface of the dock and includes a ramp that is located flush with the upper surface of the dock with the rear edge of the ramp being hinged to the dock. With this type of dockboard, the ramp is biased upwardly to an inclined position and a holding mechanism is provided which locks or restrains the ramp in the lowered position. When it is desired to load or unload a truck or other carrier, the holding mechanism is released through manual operation of a cable, and the ramp will pivot upwardly and simultaneously an extension lip on the front of the ramp will be pivoted outwardly to a position somewhat short of its fully extended position. By walking outwardly on the ramp, the ramp will pivot downwardly against the force of the biasing means to bring the lip into engagement with the bed of the truck, and the holding mechanism will hold the ramp in this position in which the ramp spans the distance between the dock and the truck bed.

With this conventional type of structure the dock is formed with a pit or depression to receive the dockboard. With a new dock installation the pit necessary to receive the dockboard can be readily formed in the dock, but with existing docks it is necessary to rebuild the dock to provide the required pit.

A second form of dockboard is that which is stored along the front surface of the dock and is particularly adapted to be installed with existing docks without alteration or modification of the dock. This type of dockboard, as disclosed in the copending patent application Ser. No. 580,347, filed Sept. 9, 1966, includes a ramp which is stored vertically adjacent the front surface of the dock and the side edges of the ramp are pivotally connected to guide members which are arranged to slide in vertical guideways mounted on the front of the dock. By lifting the ramp upwardly to a position above dock level, the ramp can be pivoted to a generally horizontal position and then lowered to span the distance between the truck bed and the dock.

The present invention is directed to a dockboard of this latter type which is adapted to be stored in front of the dock and is particularly adaptable for use with docks of relatively shallow height. More specifically, the ramp of the dockboard of the invention is counterbalanced by a series of springs which are connected through a pair of scissor-type arms to the ramp. The spring force is slightly less than the weight of the ramp, so that the ramp will be urged or biased downwardly to its vertical storage position when the ramp is not supported by the bed of a carrier. In addition, the springs are arranged so that a maximum spring force is exerted against the ramp when the ramp is initially lifted upwardly from the vertical storage position and a lesser spring force is exerted against the ramp when the ramp has been elevated to an above dock position.

The spring and scissor-arms counterbalancing mechanism enables the ramp to be used with relatively shallow docks. With the use of a counterweight mechanism, as in conventional dockboards, the counterweight must necessarily move downwardly a distance equal to the height that the ramp is elevated and very often the dock height is not sufficient to enable the counterweight mechanism to operate in this manner. With the spring and scissor-arm type of counterbalancing mechanism it is possible to elevate the ramp to an above dock level even though dock height is relatively shallow.

Due to the counterbalancing effect, the ramp can be readily lifter by the operator to a position where the lower edge of the ramp is above the level of the bed of the carrier of truck. The ramp is then pivoted to a generally horizontal position and lowered downwardly until the rear edge of the ramp engages the dock and the front edge of the ramp engages the bed of the truck. After the truck has been loaded or unloaded, the truck merely pulls away from the dock and due to the fact that the ramp is nose heavy or is biased downwardly, the ramp will pivot or swing down to a generally vertical position and the guide members will slide downwardly within the guide ways against the counterbalancing force to automatically lower the ramp to the vertical storage position where the rear edge of the ramp is located slightly beneath the upper surface of the dock. As the ramp automatically returns to its storage position after the truck pulls away from the dock, there is no danger of succeeding trucks backing into and damaging the ramp.

Because the guide members are freely movable with respect to the guideways on the dock, the ramp is readily adjustable to any relative height between the dock and the bed of the carrier. Moreover, the ramp will automatically adjust itself to variations in height caused by raising or lowering of the bed of the truck due to an increase or decrease in the weight on the truck bed.

As a further advantage, the ramp is a one-piece member having no hinges or joints and therefore, the strength of the ramp is not dependent on the strength of a hinged joint.

The dockboard of the invention is a relatively low cost unit which can be installed with existing docks without any alteration or modification of the dock. It is not necessary to reconstruct the dock to provide a pit for the dockboard for the entire unit is mounted on the front wall of the dock. As a further advantage, the entire unit, when in the vertical storage position, will not interfere with cross traffic on the dock.

Other objects and advantages will appear in the course of the following description.

The drawing illustrate the best mode presently contemplated of carrying out the invention.

In the drawings:

FIG. 1 is a front elevation of the dockboard of the invention as associated with a loading dock;

FIG. 2 is a plan view of the dockboard shown in FIG. 1;

FIG. 3 is a view similar to FIG. 1 showing the ramp in an elevated position above the level of the dock;

FIG. 5 is a view similar to FIG. 4 showing the ramp in the raised vertical position;

FIG. 6 is a view similar to FIG. 4 showing the ramp spanning the distance between the loading dock and the bed of a carrier;

FIG. 7 is and enlarged fragmentary top plan view showing the construction of the supporting framework;

FIG. 8 is an enlarged vertical section, showing the position of the springs when the ramp is elevated;

FIG. 9 is an enlarged fragmentary front elevation with parts broken away showing the attachment of one of the scissor arms to the supporting frame;

Figure 4:
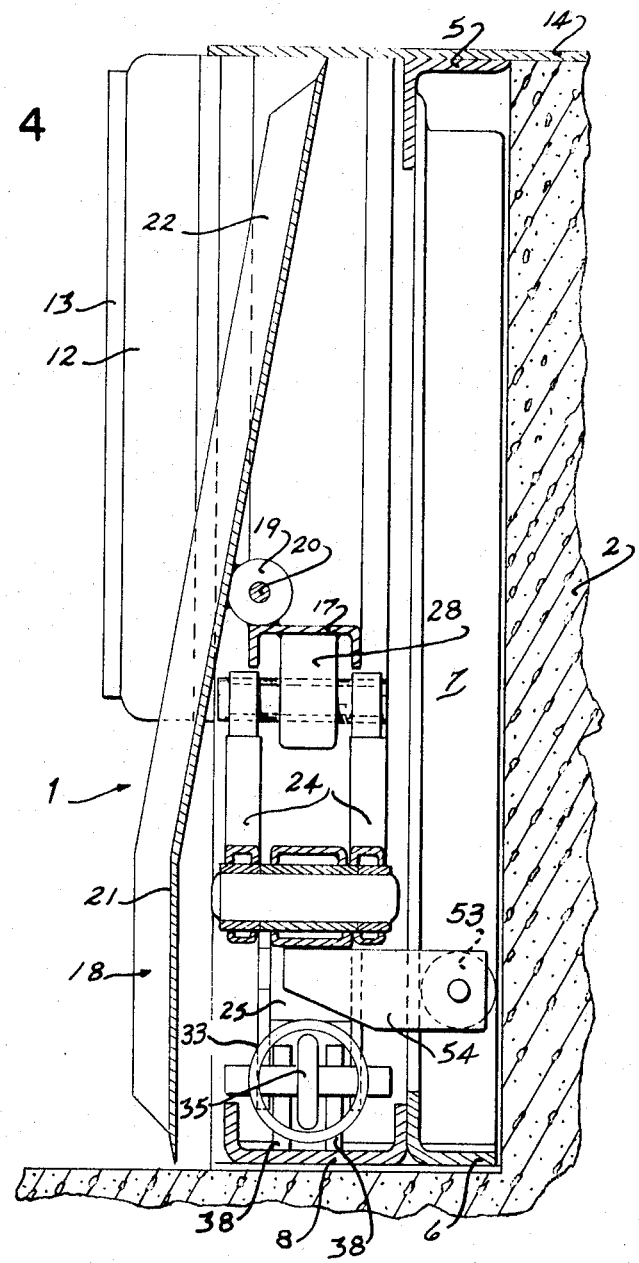
FIG. 4 is a side view of the dockboard in the position shown in FIG. 1.
Figure 11:
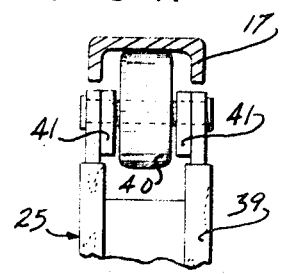
FIG. 11 is an enlarged fragmentary end view showing the roller connected to the other scissor arm which is adapted to ride on the ramp channel.

The drawings illustrate a dockboard 1, which is stored vertically adjacent the front wall of a loading dock or platform 2 and when elevated to its operative position is adapted to span the distance between the dock 2 and the bed 3 of a carrier, such as a truck.

The dockboard 1 includes a supporting structure or frame 4 which is mounted on the front wall of the dock 2 and the frame comprises an upper angle 5 which is located generally flush with the upper surface of the dock and a lower angle 6 which is spaced beneath the upper angle 5. Connecting the angles 5 and 6 are a pair of diagonal angles 7 which bear against the front surface of the dock 2. In addition, the frame includes a base channel 8 which is located forwardly of the lower angle 6.

Located along the sides of the frame are a pair of vertical channels 9 which extend the entire height of the dockboard and a similar vertical channel 10 is spaced outwardly of the channel 9 and arranged so that the flanges of the channel 10 face the flanges of the channel 9. As best shown in FIG. 1, the channel 10 extends downwardly from the upper end of the dockboard to a location just beyond the vertical midpoint of the dockboard. The flanges of the channels 9 and 10 are connected together by plates 11 to provide a generally box-shaped supporting structure for a bumper 12 which aids in protecting the dockboard from damage as a truck or other carrier is backed toward the dock. A protective plate 13 is bolted to the outer surface of the cushion or bumper 12.

As best shown in FIG. 2 a horizontal plate 14 is secured to the upper ends of the channels 9 and 10 as well as plates 11 and extends rearwardly over the upper surface of the dock and is bolted to the dock surface.

Secured to the web portion of each channel 9 are guides 15 which are spaced apart to provide vertical guideways. Mounted for vertical sliding movement within each guideway defined by the guides 15 is a slide bar 16. As shown in FIG. 1, the guide bars 15 have a length generally coextensive with the length of the plates 11 and channel 10, and the slide bar 16 has a shorter length than the guides 15.

A horizontal channel 17 is connected between the slide bars 16 at each end of the dockboard and a ramp 18 is pivotally connected to the channel 17. To provide the pivotal connection between the channel 17 and the ramp 18 both the under surface of the ramp and the upper surface of the channel 17 carry cooperating hinge members 19 which are connected together by a hinge pin 20. When in the vertical storage position, the ramp 18 hangs in a generally vertical position, as illustrated in FIG. 3, and in order to bias the ramp to this vertical position the front edge of the ramp is nose heavy, or is biased downwardly. This biasing action for the front edge of the ramp can be accomplished by locating the pivotal connection, such as illustrated by hinges 19, slightly to the rear of the center of the fore and aft dimension, or by applying additional weight to the forward end of the ramp, or by using auxilliary biasing means, such as a spring.

The ramp 18 includes a tread plate 21 which can be provided with an embossed or roughened surface to improve traction and a pair of side guards 22 are located along the side edges of the tread plate.

To enable an operator to lift the ramp upwardly from the vertical storage position, the rear edge of the ramp is provided with an opening 23 which defines a handle. The operator, by grasping the handle, lifts the ramp upwardly to a position where the forward edge of the ramp can be pivoted horizontally without the interference with the bed of the carrier located in front of the dock. After the ramp has been pivoted to the horizontal position, the operator permits the ramp to descend by gravity until the rear edge of the ramp engages the dock and the front edge of the ramp engages the bed of the carrier.

After the loading or unloading operation has been completed, the truck merely pulls away from the dock and the front edge of the ramp, being nose heavy, or otherwise biased downwardly, will pivot downwardly and simultaneously the slide bars 16 will slide downwardly within the guides 15 to thereby lower the ramp to its vertical storage position.

Figure 10:
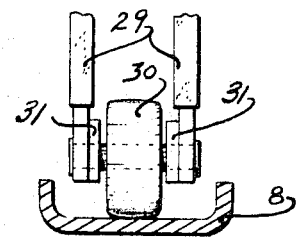
FIG. 10 is an enlarged fragmentary end view showing the roller connected to one scissor arm which is adapted to ride on the base channel.

According to the invention, the weight of the ramp 18 is counterbalanced by a spring force acting through scissor arms 24 and 25. As shown in FIGS. 4-6, there are two arms 24 which straddle the arm 25 and the arms 24 and 25 are pivotally connected at their longitudinal midpoints by a pivot pin 26. The upper curved ends 27 of arms 24 are pivotally connected to a lug 28 which is welded to the web of the channel 17, while the lower curved ends 29 of arms 24 carry a roller 30 which is mounted to ride on the web of the base channel 8. As shown in FIG. 10, a clevis 31 is also connected to the lower ends 29 of arms 24, and clevis 31 is pivotally connected to a spring hook 32 attached to one end of coil spring 33. Spring 33 is located between the upstanding flanges of the base channel 8.

The opposite end of spring 33 is connected by spring hook 34 to the generally U-shaped rod 35. The legs of rod 35 project through openings in the flange of the channel 9 and nuts 36 are threaded into the ends of the rod 35. The threaded connection provided by the nuts 36 on the ends of the rod 35 provides an adjustment for the force of the spring 33. The spring 33 acts to move the ends 29 of arms 24 in a direction toward the rod 35 to thereby pivot the arms 24 and 25 around the pin 26 and elevate the ramp.

The lower curved end 37 of arm 25 is pivotally connected to a pair of lugs 38 which are secured to the web of the base channel 8. As shown in FIG. 4, the lugs 38 straddle the U-shaped rod 35. The upper curved end 39 of arm 25 carries a roller 40 which is adapted to ride on the undersurface of the web of the channel 17 attached to the ramp 18. A clevis 41 also is connected to the upper end 39 of arm 25 and is secured to the outer end of a tube 42. Tube 42 carries a collar 43 adjacent its outer end. To support the tube 42 for sliding movement, an annular support 44 is secured to the channel 17 and the tube 42 is slidably mounted within the opening in the support 44.

A coil spring 45 is interposed between the fixed support 44 and a collar 46 secured to the end of the tube 42. Compression spring 45 acts to urge or bias the collar 46 away from the support 44 and thereby tends to move the roller 40 toward the center of the channel 17 to pivot the arms with respect to each other.

Mounted for sliding movement within the outer tube 42 is an inner tube 47, and the tubes are connected together by a pin 48 which extends through aligned openings in the walls of the outer tube 42 and slides within diametrically opposed slots 49 formed in the inner tube 47. The inner tube 47 is also mounted for sliding movement within an opening formed in support 50 which is welded to the undersurface of the channel 17 that carries the ramp 18.

A second compression spring 51 is interposed between the fixed support 50 and a cap 52 secured to the outer end of innter tube 47. Compression spring 51 also acts to urge the collar and inner tube 47 to the left, as shown in FIG. 1, and away from the fixed support 50, thereby tending to move the roller 40 toward the center of the channel 17 and pivot the arms 24 and 25 to an upright generally vertical position.

The springs 33, 45 and 51, all act in a manner to pivot the arms 24 and 25 from the generally horizontal position, as shown in FIG. 1, to a generally vertical position, as shown in FIG. 3, to thereby counterbalance the weight of the ramp. The counterbalancing action is arranged so that as the ramp is lifted by the operator all three springs 33, 45 and 51 initially act to aid in lifting the ramp. When the ramp reaches a predetermined elevation, spring 51 will be phased out, and subsequently the spring 45 will be phased out when the ramp reaches a second predetermined elevation. With this arrangement only the force of spring 33 will be acting to counterbalance the weight of the ramp when the ramp is in an above dock location.

To more specifically describe the operation of the dock board, FIG. 1 illustrates the stored position of the amp in which the ramp 18 hangs generally vertically in front of the dock 2. In this storage position the arms 24 and 25 are both generally horizontal and parallel to each other and the spring 33 is in a fully extended condition, while the springs 45 and 51 are in a fully compressed condition.

To move the dockboard to the operating position, the operator grasps the handle 23 and lifts the ramp 18 upwardly. Due to the fact that the springs 33, 51 and 45 are all acting at this time to pivot the arms 24 and 25 to a generally vertical attitude and thereby elevate the ramp, very little force is required to lift the ramp upwardly. As the ramp moves upwardly the ends 29 of arms 24 move to the left as shown in FIG. 3 thereby releasing the extension of spring 33 and similarly, the roller 40 connected to the upper end 39 of arm 25 will move to the left, as shown in FIG. 3. As the roller 40 moves to the left, the outer tube 42 will move with the roller and as the collar 46 is attached to tube 42, movement of the collar 46 will act to reduce the compression on the spring 45. After the outer tube 42 has moved through a distance corresponding to the length of the slots 49, the pin 48 will engage the inner tube 47 and continued movement of the roller 40 will thereby move the tube 47, as well as the outer tube 42 to the left, as viewed in FIG. 3. Moving inner tube 47 will reduce the compression on the spring 51 and after a predetermined degree of elevation of the ramp, the compression on spring 51 will be completely released so that the spring 51 will thereafter impart no spring force to counterbalance the weight of the ramp. Continued upward movement of the ramp will continue to move roller 40 to the left, as viewed in FIG. 3 and when a second predetermined elevation has been reached, the collar 46 will be moved to a point where the compression of spring 45 has been completely released thereby removing the force of spring 45 from the ramp. At this time only the force of spring 33 will be acting to counterbalance the weight of the ramp, and the ramp will be in a generally above-the-dock level location, as shown in FIG. 3. This release or phasing out of the force of springs 51 and 45 is important to the invention because it requires a substantially greater force to counterbalance the weight of the ramp when the arms 24 and 25 are in a generally horizontal position, as shown in FIG. 1, as compared to the spring force necessary to counterbalance the weight of the ramp when the arms are in a more nearly vertical position, as shown in FIG. 3. Therefore, this spring arrangement enables the spring force to be maintained at a value slightly less than the weight of the ramp at all angles or relative pivotal displacements of scissor arms 24 and 25.

When the ramp 18 has been elevated by the operator to its uppermost vertical position, as shown in FIG. 3, the slide bar 16 will be out of the guideways 15 and to prevent the ramp from falling forward, a roller 53 is journalled on the end of a lug 54 attached to the arm 25. Roller 53 rides on the flange of one of the diagonal braces 7 and engagement of the roller with the brace 7 prevents forward displacement of the ramp when the ramp is in its uppermost position and the guide bars 16 are out of enegagement with the guideways.

With the ramp in the fully raised position, the operator pivots the ramp to a generally horizontal position and allows the ramp to lower against the force of the spring 33 until the rear edge of the ramp rests on the dock 2 and the forward edge of the ramp rests on the bed 3 of the carrier, as illustrated in FIG. 6.

When the loading or unloading operation is completed the carrier merely pulls away from the dock, and as the front edge of the ramp is biased downwardly, the ramp will pivot to a generally vertical position. The ramp will then lower itself by gravity with the slide bars 16 moving downwardly within the guideways 15 until the ramp returns to its storage position as shown in FIGS. 1 and 4.

When the ramp begins to descend to the storage position, only the spring 33 is applying a spring force to counterbalance the weight of the ramp. However, when the ramp descends to a predetermined location, pivotal movement of arms 24 and 25 will move the outer tube 42 to the right, as viewed in FIG. 8, with the pin 48 moving within the slots 49 in the inner tube 47. When the pin 48 reaches the end of the slots 49 continued movement of the outer tube 42 will pick up the inner tube 47 so that the inner tube will then move with the outer tube. As the outer tube 42 moves, the collar 46 will engage the end of the spring 45, thereby compressing the spring so that the spring 45 will thereby exert a force to counterbalance the weight of the ramp. Subsequently, the cap 52 will engage the spring 51, thereby compressing spring 51 and applying the additional spring force of spring 51 to counterbalance the weight of the ramp. Thus, the action when the ramp is lowered is opposite to that when the ramp is elevated in that during initial downward movement only the force of the spring 33 is applied to the ramp, while subsequent downward movement of the ramp will cause the spring 45 and spring 51 to come into play to counterbalance the weight of the ramp.

The spring force counterbalancing mechanism applied to the scissors arms 24 and 25 provides a counterbalancing force just slightly less than the weight of the ramp so that little effort is required to raise the ramp form its storage position. Moreover, the scissors arrangement permits the dockboard to be utilized with very shallow docks and enables the ramp to be elevated above the level of the dock so that the ramp can be pivoted to its horizontal position.

As the ramp is a one-piece member without hinge joints a stronger unit is provided which is not dependent on the strength of the hinged joint.

I claim:

1. A dockboard to be mounted on a dock, comprising a frame secured to the front surface of the dock, a ramp having a lower vertical storage position whereat the ramp is disposed along the front surface of the dock and having an elevated operating position whereat the ramp is located above the level of the dock and spans the distance between the upper surface of the dock and the bed of a carrier, guide means associated with the frame for guiding the ramp in vertical movement, a pair of scissor arms, a first end of a first of said arms being pivotally connected to the frame and the second end of said first arm being mounted for movement on said ramp, a first end of the second of said arms being pivotally connected to the ramp and the second end of said second arm being mounted for movement on said frame, the central portions of the arms being pivotally connected together, said arms being disposed in generally parallel relationship when the ramp is in its vertical storage position and said arms being pivoted to a generally erect X-shaped configuration when the ramp is moved to its operation position, and spring means connected to the second end of one of said arms for urging said second end inwardly toward the first end of the other arm and thereby urging the arms to the generally erect X-shaped configuration.

2. The dockboard of claim 1, wherein said spring means comprises a first spring and a second spring, said first spring interconnecting the second end of the first arm and the ramp, said second spring interconnecting the second end of the second arm and the frame, said springs acting to urge the arms of the X-shaped configuration, and means responsive to the ramp being elevated to a given position above the lower vertical storage position for withdrawing the force of said first spring from the ramp so that only the force of said second spring acts to counterbalance the weight of the ramp.

3. The dockboard of claim 2, and including a third spring operably connected to the second end of the first arm and acting in conjunction with said first spring and said dockboard including means responsive to the ramp being elevated to a second predetermined position above the lower vertical storage position for withdrawing the force of said third spring from the ramp.

4. A dockboard to be mounted on a dock, comprising a frame, a guide structure connected to the frame, guide means mounted for movement with respect to said guide structure, a ramp pivotally connected to the guide means and having a vertical storage position in which the ramp is disposed vertically along the front surface of the dock with the upper edge of the ramp being below the upper surface of the dock and said ramp having an upper vertical position in which the lower end of the ramp is at an elevation above the bed of a carrier located in front of the dock whereby the ramp can be pivoted to a generally horizontal position and lowered to an operative position wherein the ramp spans the distance between the dock and he bed of the carrier, a pair of scissor arms, a first end of a first of said arms being pivotally connected to the frame and the second end of said first arm being mounted for movement on said ramp, a first end of the second of said arms being pivotally connected to the ramp and the second end of said second arm being mounted for movement on said frame, the central portions of said arms being pivotally connected together, said arms being disposed in generally parallel relationship when the ramp is in the vertical storage position and said arms being pivotable to a generally X-shaped configuration as the ramp is moved upwardly to its operative position, counterbalancing means operably connected to said scissor arms for urging the arms to the X-shaped configuration, said counterbalancing means serving to exert a counterbalancing force to counterbalance the weight of the ramp, and means responsive to a given amount of movement of the ramp from the storage position toward the upper position for decreasing said counterbalancing force.

5. The dockboard of claim 4, wherein the ramp includes a guide track on its undersurface and extending in a direction between the side edges of the ramp, the second end of the first arm having a guide element disposed to ride on the guide track as the arms are moved between the parallel and X-shaped positions.

6. The dockboard of claim 5, wherein the guide track extends continuously between the side edges of the ramp, said guide means including a vertical guide member secured to each side edge of the ramp and disposed to move within the guide structure to guide the ramp in vertical movement, the ends of said track being connected to said vertical guide members and constituting a portion of said guide means.

7. The dockboard of claim 6, wherein the guide tack comprises a downwardly facing channel and said ramp is pivotally connected to said channel.

8. The dockboard of claim 5, and including a second guide track mounted on the lower portion of the frame and disposed in parallel spaced relation beneath the first guide track, the second end of the second arm having a guide element disposed to ride on the second guide track as the arms are moved between the parallel and X-shaped positions.

9. The dockboard of claim 5, wherein said guide elements are wheels.

10. The dockboard of claim 4, wherein said counterbalancing means comprises a first spring and a second spring, said first spring interconnecting the second end of the first arm and the ramp, said second spring interconnecting the second end of the second arm and the frame, said springs acting to urge the arms to the X-shaped configuration.

11. The dockboard of claim 10 and including means responsive to a given degree of angular movement between said arms in moving from the parallel position to the X-shape position for releasing the force of one of said springs, whereby the weight of the ramp is counterbalanced solely by the other of said springs.

19. A dockboard to be mounted on a dock, comprising a frame, a pair of spaced vertical guideways mounted on the frame, a vertical guide member mounted for vertical movement in each guideway, a ramp having a pair of opposed side edges and a front edge and a rear edge, means for pivotally connecting the side edge portions of the ramp to the guide members whereby the ramp can be pivoted with respect to said guide members, said ramp having a vertical storage position in which the ramp is disposed vertically along the front surface of the dock with the upper edge of the ramp beong below the upper surface of the dock and said ramp having an upper vertical position in which the lower end of the ramp is at an elevation above the bed of the carrier, a pair of scissor arms, a first of said arms has its lower end pivotally connected to the frame and its upper end movable connected to the ramp, and the second of said arms has its lower end movably connected to the frame and its upper end pivotally connected to said ramp, and the central portions of said arms being pivotally connected together, said arms being disposed in generally parallel relationship when the ramp is in the vertical storage position and said arms being pivotable to a generally erect X-shaped configuration as the ramp is moved upwardly to its operative position, and spring means connected to the lower end of the second arm for urging the lower end of said second arm inwardly toward the lower end of said first arm and thereby urging the arms to the generally erect X-shaped configuration.

13. The dockboard of claim 12, wherein the guideways and the guide members have a relative length such that the guide members will move upwardly out of registering engagement with the guideways when the ramp is in the upper vertical position, and said dockboard includes means for preventing displacement of the ramp in a direction toward and away from the dock when the ramp is in the upper vertical position.

14. The dockboard of claim 13, wherein the last named means includes a guide track mounted on the front wall of the dock, and a guide element connected to one of said arms and disposed to ride on the track.

15. The dockboard of claim 14, wherein the guide element is located at a level beneath the location of pivotal connection of the arms.

16. The dockboard of claim 18, and including second spring means connected to the upper end of the first arm for urging the upper end of said first arm toward the upper end of the second arm.

* * * * *

UNITED STATES PATENT OFFICE
CERTIFICATE OF CORRECTION

Patent No. 3,665,538                    Dated May 30, 1972

Inventor(s)  Matthew Smith

It is certified that error appears in the above-identified patent and that said Letters Patent are hereby corrected as shown below:

Column 1, line 69, "lifter" should read -- lifted --. Column 4, line 4, "into" should read -- onto --; line 59, "amp" should read -- ramp --. Column 7, line 22, "tack" should read -- track --; line 45, "19" should read -- 12 --. Column 8, line 14, "movable" should read -- movably --; line 41, "18" should read -- 12 --.

Signed and sealed this 13th day of March 1973.

(SEAL)
Attest:

EDWARD M. FLETCHER, JR.                ROBERT GOTTSCHALK
Attesting Officer                      Commissioner of Patents